United States Patent [19]

Wechsler et al.

[11] Patent Number: 5,381,985
[45] Date of Patent: Jan. 17, 1995

[54] WINGTIP MOUNTED, COUNTER-ROTATING PROPROTOR FOR TILTWING AIRCRAFT

[75] Inventors: James K. Wechsler, Irvine, Calif.; John W. Rutherford, Scottsdale, Ariz.

[73] Assignee: McDonnell Douglas Helicopter Co., Mesa, Ariz.

[21] Appl. No.: 872,336

[22] Filed: Apr. 23, 1992

[51] Int. Cl.⁶ .............. B64C 11/48; B64C 27/08; B64C 27/22; B64C 27/52
[52] U.S. Cl. .............. 244/7 C; 244/12.4; 244/56; 244/66; 244/69
[58] Field of Search .............. 244/6, 7 C, 7 R, 12.4, 244/17.23, 56, 66, 69

[56] References Cited

U.S. PATENT DOCUMENTS

| | | | |
|---|---|---|---|
| 1,806,648 | 5/1931 | Salisbury et al. | 244/7 R |
| 2,434,276 | 1/1948 | Laskowitz | 244/66 |
| 2,494,368 | 1/1950 | Steele et al. | 244/69 |
| 2,994,492 | 8/1961 | Dobson et al. | 244/66 |
| 3,035,789 | 5/1962 | Young | 244/7 C |
| 3,248,073 | 4/1966 | Blythe | 244/6 |
| 4,589,611 | 5/1986 | Ramme et al. | 244/6 |
| 5,054,716 | 10/1991 | Wilson | 244/7 R |
| 5,054,998 | 10/1991 | Davenport | 244/69 |

FOREIGN PATENT DOCUMENTS 1005201 11/1957 France .............. 244/7.3

OTHER PUBLICATIONS

Aviation Week, "Hiller Awarded VTOL Contract" Feb. 18, 1957 p. 37.

Primary Examiner—Michael S. Huppert
Assistant Examiner—Virna Lissi Ansley
Attorney, Agent, or Firm—Donald E. Stout; John P. Scholl

[57] ABSTRACT

A tiltwing aircraft, capable of in-flight conversion between a hover and forward cruise mode, employs a counter-rotating proprotor arrangement which permits a significantly increased cruise efficiency without sacrificing either the size of the conversion envelope or the wing efficiency. A benefit in hover is also provided because of the lower effective disk loading for the counter-rotating proprotor, as opposed to a single rotation proprotor of the same diameter. At least one proprotor is provided on each wing section, preferably mounted on the wingtip, with each proprotor having two counter-rotating blade rows. Each blade row has a plurality of blades which are relatively stiff-in-plane and are mounted such that cyclic pitch adjustments may be made for hover control during flight.

8 Claims, 2 Drawing Sheets

WINGTIP MOUNTED, COUNTER-ROTATING PROPROTOR FOR TILTWING AIRCRAFT

The invention described herein was made in the performance of work under NASA Contract No. NAS2-13070 and is subject to the provisions of Section 305 of the National Aeronautics and Space Act of 1958 (42 U.S.C. 2457).

BACKGROUND OF THE INVENTION

This invention relates to aircraft, and more particularly to a new concept of a counter-rotating proprotor designed for wingtip mounting on tiltwing aircraft.

Tiltwing aircraft are designed to tilt their wing from a horizontal position in cruise to a vertical position in hover. They operate like a helicopter with the wing in the vertical position. For high speed forward flight, the wing tilts to the horizontal position and operates in a manner similar to that of a standard turboprop airplane. To successfully convert the aircraft from hover to cruise (conversion) or from cruise to hover (reconversion) the wing must operate over a wide range of angles of attack without stalling. The propulsors (usually propellers or a hybrid propeller/rotor combination called a proprotor, which provides the attributes of a propeller when in the level flight (cruise) position and the attributes of a helicopter rotor when in the vertical (hover) position) have a strong impact on the wing's angle of attack range since they (1) increase the velocity over the wing (this is beneficial), (2) deflect the flow over the wing (this too is beneficial), and (3) in single rotation propulsors impart a swirl component to the flow over the wing. This third feature may be either beneficial or detrimental, depending upon the direction of the swirl component. In order to reduce the power requirements of tiltwing aircraft, thereby making them more efficient and more attractive with respect to conventional single-mission type aircraft, it is desirable to move the proprotors outboard to the wingtip, so that larger diameter (lower disk loading) proprotors may be used. This has a negative impact on the aircraft's conversion envelope (the combination of altitude, descent rate, and power setting) however, because reducing the disk loading also reduces the velocity increase over the wing and the deflection angle of the proprotor slipstream.

For low disk loading, single-rotation, wingtip-mounted proprotors, the swirl imparted to the flow has a significant impact on a tiltwing aircraft's conversion envelope and cruise performance. If the proprotor is turned in a direction opposite to the wingtip vortex, a wing efficiency benefit is realized. However, during conversion, turning the proprotor in this direction causes a swirl component that increases the wing's angle of attack, causing the wing to stall at a lower incidence angle. This reduces the conversion envelope. Contrarily, if the proprotor is turned in the same direction as the wingtip vortex, the conversion envelope is increased but the wing efficiency is decreased. Thus, the designer is faced with a paradox of either decreasing the conversion envelope or decreasing the wing efficiency.

What is needed, therefore, is a new approach which does not force a tradeoff between the size of the conversion envelope and the wing efficiency, while permitting an increased cruise (or propulsor) efficiency.

SUMMARY OF THE INVENTION

This invention solves the problem outlined above by providing a new proprotor arrangement which permits a significantly increased cruise efficiency without sacrificing either the size of the conversion envelope or the wing efficiency. There is also a benefit in hover. The effective disk loading for the counter-rotating proprotor is lower, thus reducing the induced power over a single proprotor of the same diameter, producing the same thrust. As a result, with this innovation, the cruise performance of a tiltwing aircraft is greatly improved over comparable single-rotation proprotors and the hover performance is significantly improved over typical propeller driven tiltwings. This greater performance is sufficient to make the tiltwing design competitive for certain missions because of its greater versatility.

The invention comprises an aircraft capable of in-flight conversion between a hover and a forward cruise mode which comprises a fuselage having a starboard side and a port side. A wing section extends from each of the starboard and port sides, each wing section being fixed in both the hover mode and the forward cruise mode. At least one proprotor is mounted on each of the starboard and port wing sections. Each proprotor has two blade rows positioned one behind the other along a common rotational axis, with each blade row having a plurality of blades which are relatively stiff-in-plane (as compared to soft-in-plane helicopter rotors) and are mounted such that cyclic pitch adjustments may be made for hover control during flight. The two blade rows are counter-rotating.

Preferably, the aircraft is of the tiltwing type, with the wing sections tilting, in a conversion mode, from a vertical position in the hover mode to a horizontal position in the forward cruise mode, and conversely tilting, in a reconversion mode, from a horizontal position in the forward cruise mode to a vertical position in the hover mode. Each proprotor consists of two, preferably gimballed rotor hubs, with one blade row being mounted on each hub. These hubs are configured to allow full cyclic pitch adjustment of each blade.

The above mentioned and other objects and features of this invention and the manner of attaining them will become apparent, and the invention itself will be best understood, by reference to the following description taken in conjunction with the accompanying illustrative drawings.

DETAILED DESCRIPTION OF THE DRAWINGS

Figure 1:
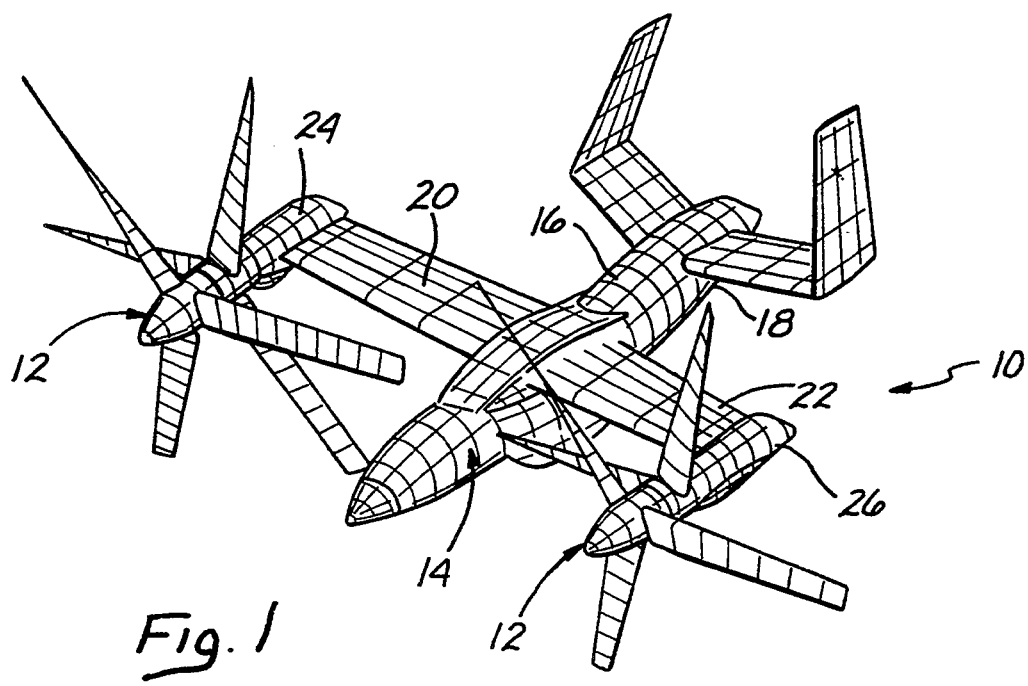
FIG. 1 is an isometric perspective view of a tiltwing aircraft incorporating the counter-rotating proprotors of the invention.

Referring now to FIG. 1, there is shown a VSTOL (Vertical Short TakeOff and Landing) tiltwing aircraft 10 which includes a plurality of counter-rotating proprotors 12, a fuselage 14 which has a starboard side 16 and a port side 18, and wing sections 20 and 22, extending from each of the fuselage starboard and port sides 16, 18, respectively. In the preferred embodiment, one counter-rotating proprotor 12 is mounted on the tip 24, 26 of each wing section 20, 22. Mounting the proprotor 12 on the tip of the wing section, or as closely thereto as possible, is advantageous since it allows larger diameter (lower disk loading) rotors to be used, without the risk of impacting the fuselage with the rotating rotor blades. Of course, it is within the scope of the invention to mount the proprotor anywhere along the length of the wing section 20, 22, as well as to employ two or more proprotors 12 on each wing section. In the case where more than one proprotor is mounted on each wing section 20, 22, it will generally be advantageous to mount one on each wing tip 24, 26, with the others on each wing section 20, 22 being mounted as closely to the wingtip as possible, though they may in fact be mounted anywhere along the length of each wing section, depending upon various design considerations.

Figure 2:
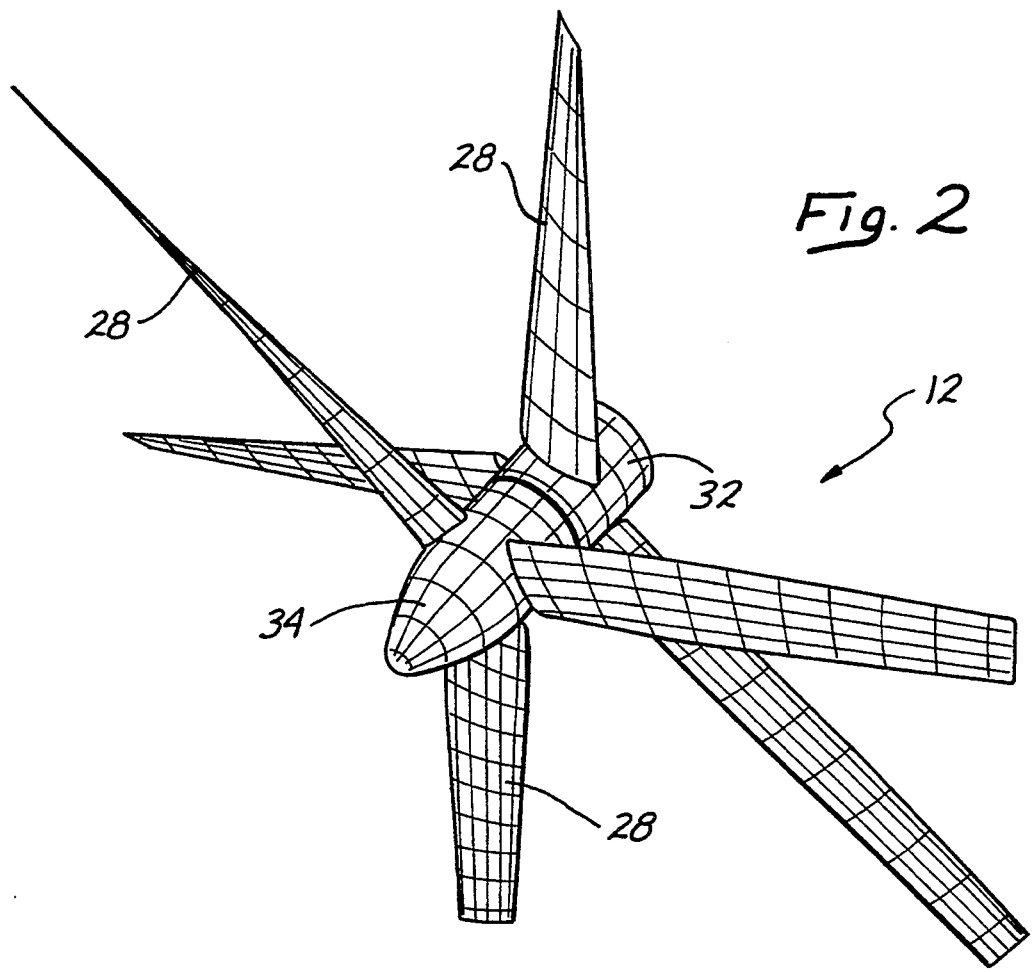
FIG. 2 is an enlarged isometric view of one of the counter-rotating proprotors shown in FIG. 1.
Figure 4:
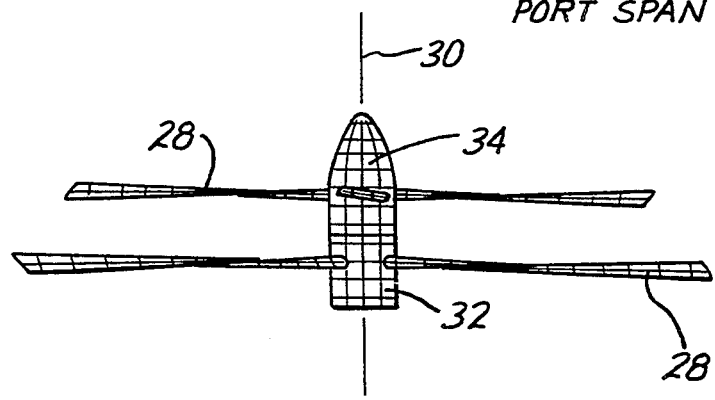
FIG. 4 is a side view of the counter-rotating proprotor shown in FIG. 2.
Figure 5:
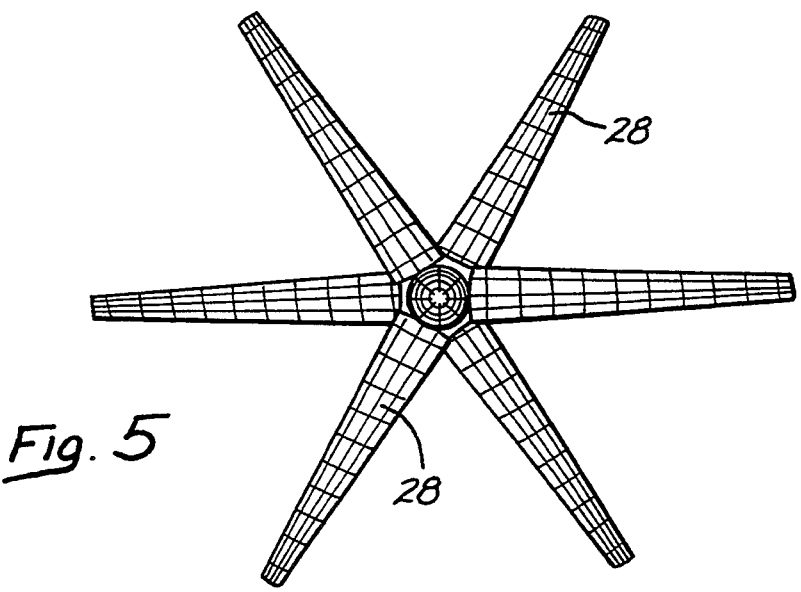
FIG. 5 is a top view of the counter-rotating proprotor shown in FIG. 2.

Now viewing FIGS. 2, 4, and 5, which show in greater detail a representative low disk loading, counter-rotating proprotor 12, it can be seen that the proprotor 12 comprises two rows of blades 28 mounted one behind the other along axis 30 and rotating counter to one another. In one preferred embodiment, three blades 28 are employed in each blade row, but any number of blades could be used. The blades 28 are constructed in a manner similar to a helicopter blade, but, unlike a typical helicopter blade, are stiff-in-plane as opposed to soft-in-plane. The blades' airfoils, planform, and twist distribution are aerodynamically optimized to provide the best compromise between cruise and hover performance. The blades are mounted on two rotor hubs 32, 34 so that full cyclic pitch control is provided. Cyclic control of the rotors provides control of the aircraft during helicopter flight. This locks out in aircraft mode, with control accomplished using conventional airplane control surfaces. Various types of rotor hubs may be employed, although a gimballed hub design, because of its lack of complexity, is preferred. The design of the blades 28 themselves is generally based upon the known design of the single rotation proprotors used on the Bell-Boeing V-22 Osprey tiltrotor aircraft currently in development for the U.S. Department of Defense, though of course other designs could be used. In any event, the blades 28 would need to be specifically designed for adaptation to the performance envelope required in a particular aircraft, this design procedure being within the purview of one of ordinary skill in the art.

As noted above, single-rotation proprotors for fixed wing aircraft, wherein the proprotor is capable of full cyclic pitch adjustments, as opposed to an ordinary propeller which does not provide for cyclic pitch adjustment, are known in the prior art. However, the inventors have discovered that their novel counter-rotating proprotor arrangement provides for unexpectedly improved results when employed on a tiltwing aircraft like that shown in FIG. 1. More specifically, by adding a second, counter-rotating blade row behind the first blade row, almost all of the swirl can be taken out of the airflow behind the proprotor. This has two major effects. First, the efficiency of the counter-rotating proprotor is greatly increased. The increase is roughly equal to the increase in wing cruise efficiency obtained by turning a single-rotation proprotor in a direction opposite to the wingtip vortex. In both cases the efficiency increase is due to the swirl energy being removed, either by the rear blade row or by the wing. Second, the counter-rotating proprotor imparts hardly any swirl to the flow. Therefore, the conversion envelope and the wing cruise efficiency of the vehicle are neither increased nor decreased. In sum, the use of a wingtip-mounted counter-rotating proprotor increases the proprotor efficiency without degrading the wing efficiency or the vehicle's conversion envelope.

By way of example, demonstrating the greatly improved efficiency obtainable because of the employment of a counter-rotating proprotor rather than a single rotation proprotor, a counter-rotating proprotor was designed for a high speed rotorcraft military transport tiltwing. This proprotor was designed to the same hover and cruise conditions as a baseline single-rotation proprotor. These design conditions are shown in Table 1:

TABLE 1

| Disign Conditions for a high speed tiltwing aircraft | | |
|---|---|---|
| HOVER: | Altitude | 4000 ft. |
| | Temperature | 95° F. |
| | Thrust$_{hover}$ | 28,149 lb. |
| CRUISE: | Altitude | 15,000 ft. |
| | V$_{cruise}$ | 450 knots |
| | M$_{cruise}$ | 0.718 |
| | Thrust$_{cruise}$ | 4,339 lb. |
| DESIGN VARIABLES HELD CONSTANT | Disk Loading | 35 lb/ft$^2$ |
| | Solidity | 0.185 |
| | V$_{tiphover}$ | 750 ft/sec |

In addition, the solidity of the proprotors, defined as:

$$\sigma = \text{Blade Area/Disk Area} \tag{1}$$

was held constant. Also, the hover tip speed was held constant at 750 ft/sec and the maximum torque of the counter-rotating proprotor was limited to that of the single-rotation proprotor. This allowed a true comparison between counter-rotating and single-rotation proprotors. Table 2 summarizes the resulting performance of each proprotor:

TABLE 2

| Results of Proprotor Performance Analysis | | |
|---|---|---|
| PARAMETER | SINGLE-ROTATION | COUNTER-ROTATION |
| Cruise Efficiency | 0.790 | 0.847 (+7.3%) |
| Maximum Torque (ft-lb) | 175,644 | 175,644 (0.0%) |
| Δ Wing Efficiency | −0.204 | 0.0 (+26.6%) |

The numbers in parentheses represent the percentage change from the single-rotation proprotor. Note that the counter-rotating proprotor is 0.057 (7.3%) more efficient than the single-rotation proprotor. Also, the Oswald efficiency factor, defined as:

$$e = C_L^2 / C_D \pi AR \tag{2}$$

wherein e represents wing efficiency, $C_L$ is the coefficient of lift, $C_D$ is the coefficient of drag, and AR is the wing aspect ratio (AR = $B^2/S$ where B is the span and S is the wing area), is reduced by 0.204 with a single-rotation proprotor but not at all (an effective 26.6% increase) by the counter-rotating proprotor. This large degradation in wing efficiency for a single-rotation proprotor is due to a non-optimum span loading caused by the proprotor swirl.

Figure 3:
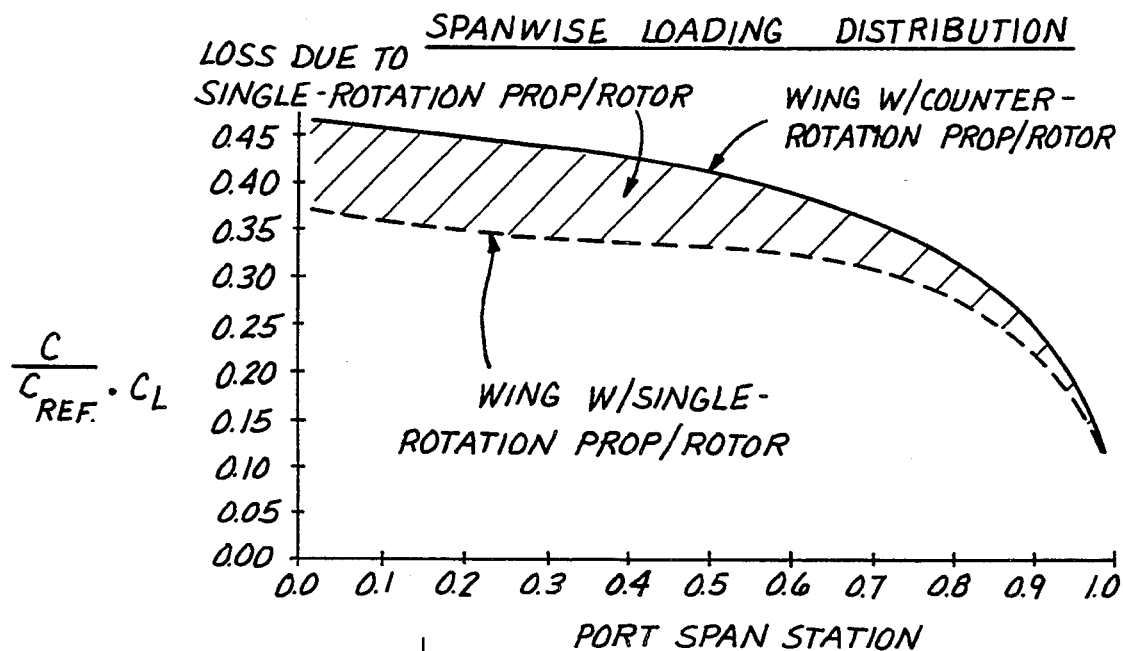
FIG. 3 is a graph depicting the incremental change in lift across the wingspan in cruise, comparing a wing having a single rotation proprotor to an identical wing having a counter-rotating proprotor.

Referring now to FIG. 3, a graph is depicted which compares the incremental change in lift for a wing having a single-rotation proprotor with that of a wing having a counter-rotating proprotor, across the span of the wing. The y-axis (ordinate) represents the incremental change in lift, wherein C is the chord, $C_{REF}$ is the reference chord, and $C_L$ is the lift coefficient. The x-axis (abscissa) represents the position along the span of the wing, ranging from the centerline at 0.0 to the tip at 1.0. The shaded area between the dashed line (single-rotation proprotor) and the solid line (counter-rotating proprotor) represents the increased efficiency across the wing derivable by employing the inventive counter-rotating proprotors in a typical tiltwing application. The net result, for the tiltwing aircraft utilized in this example, was a large increase in proprotor cruise efficiency without the large penalty to wing efficiency associated with single-rotation proprotors.

Although the inventive counter-rotating proprotor disclosed in this application is especially suited for application in a tiltwing aircraft environment, it can be used with a variety of other VSTOL concepts as well. An example would be a very high-speed tiltrotor aircraft. In this case the principle application would be to eliminate the swirl component at high speed. Swirl at high speeds is detrimental to wing performance by reducing the wing's critical Mach number at which shock waves are induced on the wing's upper surface, increasing drag) due to the wing's strong sensitivity to angle of attack. Thus, using a counter-rotating proprotor provides a better flow environment to the wing.

The wingtip-mounted, counter-rotating proprotor concept synthesizes the best qualities of counter-rotating propellers and single-rotation proprotors to provide a highly efficient cruise propulsor that offers rotor-like hover control. The use of counter-rotation allows a low to moderate disk loading propulsor to be applied to a tiltwing concept without degrading the vehicle's conversion envelope or its wing efficiency. The lower effective disk loading for the counter-rotating proprotor provides a benefit in hover, since the induced power is lower than that for a single proprotor of the same diameter and thrust rating. Furthermore, the wingtip-mounted counter-rotating proprotor is unique in its ability to provide efficient cruise performance (both wing and propulsor) and hover control for tiltwing aircraft. Previous similar concepts were unable to synthesize the cruise performance benefits with the hover capability that is inherent in the counter-rotating proprotor concept.

Although an exemplary embodiment of the invention has been shown and described, many changes, modifications, and substitutions may be made by one having ordinary skill in the art without departing from the spirit and scope of the invention. Therefore, the scope of the invention is to be limited only in accordance with the following claims.

What is claimed is:

1. An aircraft capable of in-flight conversion between a hover mode and a forward cruise mode, comprising:
    a fuselage having a starboard side and a port side;
    a wing section extending from each of said starboard and port sides, each said wing section being fixed in both the hover mode and the forward cruise mode; and
    at least one proprotor mounted on each of said starboard and port wing sections, each said proprotor comprising two blade rows positioned one behind the other along a common rotational axis, each blade row having a plurality of blades which are relatively stiff-in-plane and are mounted such that cyclic pitch adjustments may be made for hover control during flight, said two blade rows being counter-rotating;
    wherein said starboard and port wing sections each have one of said proprotors mounted substantially on its tip end, so that the proprotor may have a relatively large diameter without impacting the fuselage; resulting in lower disk loading.

2. The aircraft as recited in claim 1, wherein said aircraft is of the tiltwing type, said wing sections tilting, in a conversion mode, from a vertical position in the hover mode to a horizontal position in the forward cruise mode, and conversely tilting, in a reconversion mode, from a horizontal position in the forward cruise mode to a vertical position in the hover mode.

3. The aircraft as recited in claim 1, wherein there is one proprotor mounted on each of said starboard and port, wing sections.

4. The aircraft as recited in claim 1, wherein there are a plurality of proprotors mounted on each of the starboard and port wing sections, one proprotor on each wing section being mounted on the tip thereof and the remaining proprotors on each wing section being mounted as closely to the wingtip as possible.

5. The aircraft as recited in claim 1, wherein each said proprotor includes two rotor hubs, one of said blade rows being mounted on each said rotor hub.

6. A tiltwing aircraft capable of in-flight conversion between a hover mode and a forward cruise mode, comprising:
    a fuselage having a starboard side and a port side;
    a wing section extending from each of said starboard and port sides, each said wing section being fixed in both the hover mode and the forward cruise mode, and being arranged to tilt, in a conversion mode, from a vertical position in the hover mode to a horizontal position in the forward cruise mode, and conversely tilting, in a reconversion mode, from a horizontal position in the forward cruise mode to a vertical position in the hover mode; and
    a proprotor mounted on the tip of each of said starboard and port wing sections, said proprotor comprising two blade rows positioned one behind the other along a common rotational axis, each blade row having a plurality of blades which are relatively stiff-in-plane and are mounted such that cyclic pitch adjustments may be made for hover control during flight, said two blade rows being counter-rotating.

7. The aircraft as recited in claim 6, wherein there are a plurality of proprotors mounted on each of the starboard and port wing sections, one proprotor on each wing section being mounted on the tip thereof and the remaining proprotors on each wing section being mounted as closely to the wingtip as possible.

8. The aircraft as recited in claim 6, wherein each said proprotor includes two rotor hubs, one of said blade rows being mounted on each said rotor hub.

* * * * *